United States Patent
Hertaus (10) Patent No.: US 9,801,501 B1
(45) Date of Patent: Oct. 31, 2017

(54) TRAY HOLDER

(71) Applicant: Vision Home Products, Inc., Le Sueur, MN (US)

(72) Inventor: Alan Hertaus, Le Sueur, MN (US)

(73) Assignee: Vision Home Products, Inc., Le Sueur, MN (US)

( * ) Notice: Subject to any disclaimer, the term of this patent is extended or adjusted under 35 U.S.C. 154(b) by 0 days.

(21) Appl. No.: 15/284,785

(22) Filed: Oct. 4, 2016

(51) Int. Cl.
| | |
|---|---|
| A47F 3/14 | (2006.01) |
| A47J 47/00 | (2006.01) |
| A47B 88/00 | (2017.01) |
| A47J 47/16 | (2006.01) |
| A47J 31/44 | (2006.01) |
| A47B 88/487 | (2017.01) |

(52) U.S. Cl.
CPC .............. *A47J 47/16* (2013.01); *A47B 88/487* (2017.01); *A47J 31/4403* (2013.01)

(58) Field of Classification Search
CPC ........ A47J 47/16; A47J 31/4403; A47J 31/44; A47J 31/3642; A47F 3/063; A47F 7/146; A47F 7/0028; A47F 7/0071; A47F 7/28; A47F 7/283; A47B 88/969; A47B 2088/0448; A47B 88/10; A47B 88/20; A47B 88/0418; A47B 88/0466; A47B 88/04; A47B 88/0451; A47B 46/00; A47B 96/025; A47B 96/067; A47B 2088/401; A47B 88/437; A47B 88/487
USPC ............ 211/126.15, 85.4, 10, 74; 312/330.1, 312/290, 348.3; D7/600.1, 600.3
See application file for complete search history.

(56) References Cited

U.S. PATENT DOCUMENTS

| | | | | | |
|---|---|---|---|---|---|
| 2,161,629 | A | * | 6/1939 | McCord | B65D 85/305 211/126.1 |
| 5,244,272 | A | * | 9/1993 | Thompson | A47B 88/407 211/74 |
| D525,488 | S | * | 7/2006 | McWhorter | D3/294 |
| D628,444 | S | * | 12/2010 | Snider | D7/600.1 |
| D628,445 | S | * | 12/2010 | Snider | D7/600.1 |
| D644,491 | S | * | 9/2011 | Snider | D7/600.1 |
| D650,636 | S | * | 12/2011 | Roth | D7/600.1 |
| D659,482 | S | * | 5/2012 | Snider | D7/600.1 |
| D660,652 | S | * | 5/2012 | Tiemann | D7/600.1 |
| D661,950 | S | * | 6/2012 | Greenwood | D7/590 |
| D661,951 | S | * | 6/2012 | Tiemann | D7/600.1 |
| D665,230 | S | * | 8/2012 | Snider | D7/600.1 |
| D676,715 | S | * | 2/2013 | Tsai | D7/600.1 |
| D679,954 | S | * | 4/2013 | Snider | D7/600.1 |
| D680,380 | S | * | 4/2013 | Tiemann | D7/600.1 |
| D681,398 | S | * | 5/2013 | Tsai | D7/600.1 |
| D684,404 | S | * | 6/2013 | Hertaus | D6/705 |
| D686,463 | S | * | 7/2013 | Rones | D7/600.1 |
| D686,464 | S | * | 7/2013 | Tiemann | D7/600.1 |
| D695,078 | S | * | 12/2013 | Hertaus | D7/600.1 |

(Continued)

*Primary Examiner* — Jennifer E. Novosad
(74) *Attorney, Agent, or Firm* — Haugen Law Firm PLLP (57) ABSTRACT

A tray holder apparatus that includes a frame on which a coffee maker may rest and a compartment into which a tray may be slid. The tray that slides into the frame is adaptable for receiving and displaying single serving beverage packages. A portion of the frame rolls over a countertop while the remaining portion of the frame rolls over a base of the tray holder apparatus. The tray may be slid in and out of the frame while the frame remains stationary above the base or while the frame is slid out from the base.

17 Claims, 14 Drawing Sheets

(56) References Cited

U.S. PATENT DOCUMENTS

| | | | | |
|---|---|---|---|---|
| D697,744 S | * | 1/2014 | Lipper McCauley | D6/706 |
| D701,090 S | * | 3/2014 | Sabounjian | D7/600.1 |
| D703,003 S | * | 4/2014 | Tiemann | D7/600.1 |
| D703,004 S | * | 4/2014 | Tsai | D7/600.1 |
| D709,718 S | * | 7/2014 | Snyder | D6/682.4 |
| D713,691 S | * | 9/2014 | Sabounjian | D7/600.1 |
| D722,831 S | * | 2/2015 | Tuang | D7/600.1 |
| D724,388 S | * | 3/2015 | Smeja | D24/229 |
| 8,974,014 B1 | * | 3/2015 | Tiemann | A47B 88/20 211/71.01 |
| D734,101 S | * | 7/2015 | Greenspon | D7/600.1 |
| D743,748 S | * | 11/2015 | Tiemann | D7/600.1 |
| 9,211,009 B2 | * | 12/2015 | Greenwood | A47B 73/00 |
| D750,442 S | * | 3/2016 | Tiemann | D7/600.1 |
| D755,574 S | * | 5/2016 | Lee | D7/600.1 |
| D764,236 S | * | 8/2016 | Hertaus | D7/600.1 |
| D767,309 S | * | 9/2016 | Akana | D6/682.2 |
| D769,073 S | * | 10/2016 | Lipper McCauley | D7/600.4 |
| 2007/0045150 A1 | * | 3/2007 | Huffer | B65D 83/0463 206/538 |
| 2013/0020225 A1 | * | 1/2013 | Zabinski | A47B 67/04 206/557 |
| 2013/0186780 A1 | * | 7/2013 | Betesh | B65D 73/00 206/223 |
| 2013/0193825 A1 | * | 8/2013 | Betesh | A47B 88/04 312/400 |
| 2014/0048538 A1 | * | 2/2014 | Sabounjian | B65B 5/08 220/486 |
| 2014/0091695 A1 | * | 4/2014 | Sabounjian | A47J 31/3642 312/348.3 |
| 2014/0097119 A1 | * | 4/2014 | Zabinski | A47B 77/16 206/562 |
| 2014/0097120 A1 | * | 4/2014 | Sabounjian | A47J 31/44 206/565 |
| 2014/0265787 A1 | * | 9/2014 | Sabounjian | A47B 97/00 312/334.1 |

* cited by examiner

TRAY HOLDER

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention pertains generally to a kitchen counter storage system that is especially useful for both displaying a coffee maker and also displaying or containing single serve beverage pods, capsules, bags, condiments, and the like. The invention further pertains to a storage system that is particularly useful for moving a coffeemaker on a countertop without the need to slide the entire storage system on the counter and without the need to remove the coffee maker from the storage system.

BACKGROUND

Many kitchens include counter space to allow for the preparation of foods and drinks within the confines of the kitchen. In many kitchens the countertop space is limited and efficient use of space is a necessity. Further, a user may prefer to reduce a cluttered look on the countertops. Appliances that are used frequently, such as a coffee maker, are regularly stored on the kitchen counter space. The appliances that are stored on the countertops are often stored on countertops underneath overhanging cupboards. When a user desires to use the appliance, often times the appliance must be slid from underneath the cupboards in order to utilize all the functions of the appliance.

Over the years, different coffee makers have been implemented to create distinct brews of tea and coffee. These coffee makers have been utilized to brew larger quantities or multiple cups of a beverage. With the frequent use of these beverage makers, they're often found stored on the counter top of a kitchen. More recently, single serve beverage makers have been implemented to brew a single serving of tea or coffee, for example. These beverage makers may utilize a beverage package in the form of a capsule, pod, or bag. With the advent of the single serve beverage maker it has become desirable to store and display the single serve beverage packages on the kitchen countertop near the beverage maker. Further, it may be desirable to store the single serve beverage packages near the beverage maker without using up additional counter space.

SUMMARY

Embodiments according to aspects of the invention provide an apparatus to efficiently move a beverage maker between a stored position underneath a cupboard and an operable position upon the countertop. The apparatus according to aspects of the invention further provides an efficient compartment that offers a storage space for single serve beverage packages that is also particularly useful to both store and display the single serve beverage packages.

The apparatus of the invention generally includes a stationary base, extendable frame, and extendable tray. In an embodiment of the invention, the base has a top surface and bottom surface, wherein the bottom of the base rests on the countertop. The bottom of the base may further include a gripping member that restricts movement of the base on the countertop. The frame is slidingly coupled to the base, wherein a portion of the frame slides above the top surface of the base between an extended and retracted position of the frame. The base remains stationary on the countertop while the frame slides over the countertop. The frame has at least two sets of wheels that are rotatably attached to the frame. In order to provide a smooth rolling of the frame along the countertop, the front set of wheels does not contact the base when the frame is in either the retracted or extended positions. Further the rear set of wheels contact the base when the frame is in the retracted position and also contact the base when the frame is in an extended orientation. The tray interlocks with the frame and is orientable between an open and stowed position. The front portion of the tray extends from the frame when the tray is oriented in the open position and the front portion of the tray aligns with a front end perimeter of the frame when the tray is in the stowed position.

Aspects of the invention may further include slots formed in the base. The slots are preferably dimensioned to receive the front set of wheels and allow the wheels to remain in contact with the countertop when the frame is oriented in the retracted or stowed position. The frame may include an open bottom portion and rails that extend through the open portion. Further, the frame may have at least partially open sides and back to allow air to pass through the frame. The tray may include spaced apart receptacles, wherein the receptacles form columns and rows within the tray. The top edge of each of the receptacles may be angled to display tops of pods at an angle when the tray is in the open position.

Another embodiment according to aspects of the invention includes an apparatus for supporting a beverage maker and single serve beverage packages without requiring increased counter space for both. The apparatus according to aspects of the invention includes a base, a frame, and a drawer or tray. The base has a planar top and bottom surface portions, wherein the base has slots formed in the base. The slots are adapted for receiving wheels rotatably attached to a front portion of the frame. The frame is slidingly coupled to the base, wherein the frame slides above the base between an extended and stored position. The frame has at least two wheels positioned within the slots that do not contact the base when the frame is in the stored position. The frame further has at least two wheels in contact with the base when the frame is in the stored position. The tray interlocks with the frame and is orientable between an open and stowed position. The tray has a front portion that extends from the frame when the tray is oriented in the open position and the front portion of the frame aligns with a perimeter of the frame when in a closed position. The interior of the tray may include rows and columns of spaced apart receptacles within the tray. Each receptacle has a top edge that is angled relative to a planar top of the tray such that a single serve beverage package (including a pod, capsule or bag) rests in the receptacle to display a top of the beverage package (pod, capsule or bag) at an angle relative to a surface on which the base rests.

These and other embodiments according to aspects of the invention include a gripping member on the planar bottom surface of the base. The frame may have an open bottom portion and rails that extend through the open portion.

Further, the frame may have at least partially open sides and back to allow air to pass through the frame. Additionally, the frame may have at least partially open sides and back to allow air to pass through the frame.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The tray holder apparatus 10 of the present invention is particularly well suited for displaying a single serve coffee maker on a countertop. The tray holder 10 generally includes a frame 40 on which the single serve coffee maker may be positioned. The frame 40 is further adapted to receive a tray 80 that is suitable for storing and displaying single serve beverage packages within the tray 80. The tray 80 interlocks with the frame 40 and slides between an open and stowed position. The frame 40 is coupled to a base 20 and travels above the base 20 between an extended and retracted orientation. When a coffee maker rests on the frame 40, the frame travels to efficiently move the coffee maker from a stored position underneath a cupboard and an operable position on the countertop. The apparatus 10 further provides tray 80 that stores single serve beverage packages and that may also be oriented to display the single serve beverage packages. The apparatus 10 will now be described in greater detail in conjunction with the Figures.

With reference to FIGS. 1-4, the apparatus 10 is illustrated with the frame 40 in the retracted orientation and the tray 80 in the closed or stowed position. The frame 40 rests above base 20 with rollers or wheels 60 and 62 in contact and engaged with top surface 22 of base 20. Gripping members 32 are fixed to a bottom surface 24 of the base 20. The gripping members may be a neoprene, rubber or other material of known suitable construction that increases the stiction between the base 20 and a countertop. When in either the closed orientation or open position (of either or both the tray and frame) the tray 80 and frame 40 provide an aesthetic presentation and create an appeal for the beverage maker and single serve beverage packages.

Figure 1:
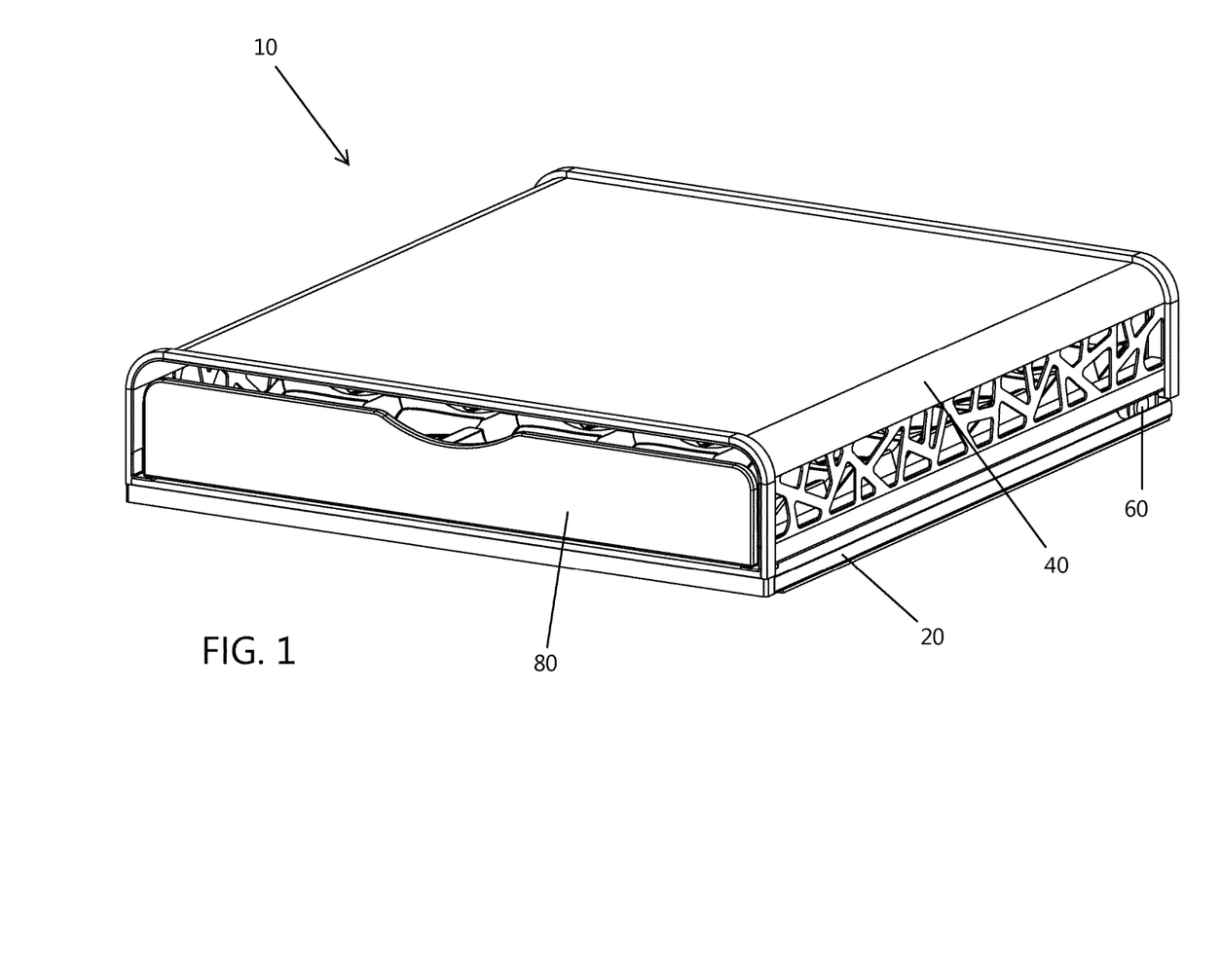
FIG. 1 is a front, right, top perspective view of a tray holder apparatus of the present invention.
Figure 2:
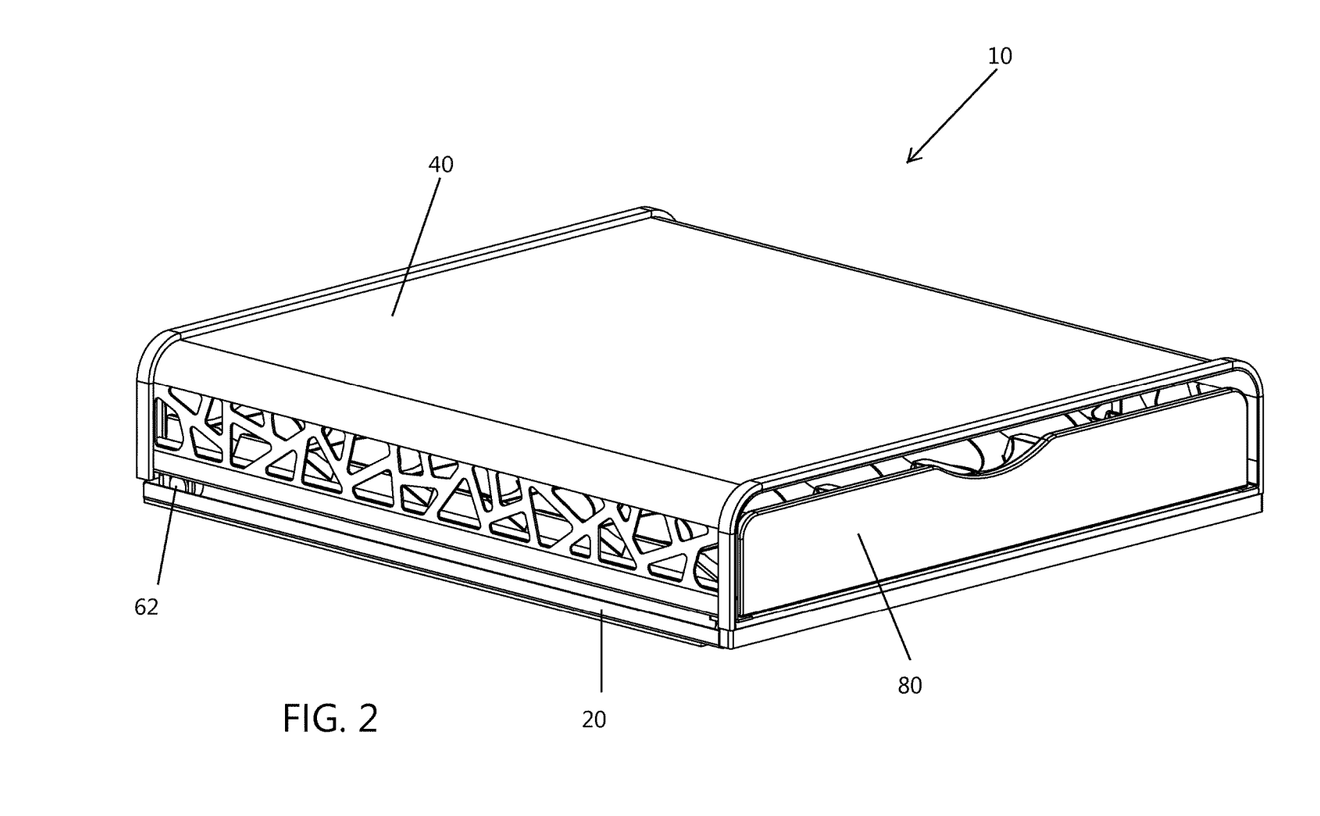
FIG. 2 is a front, left, top perspective view of a tray holder apparatus of the type shown in FIG. 1.
Figure 3:
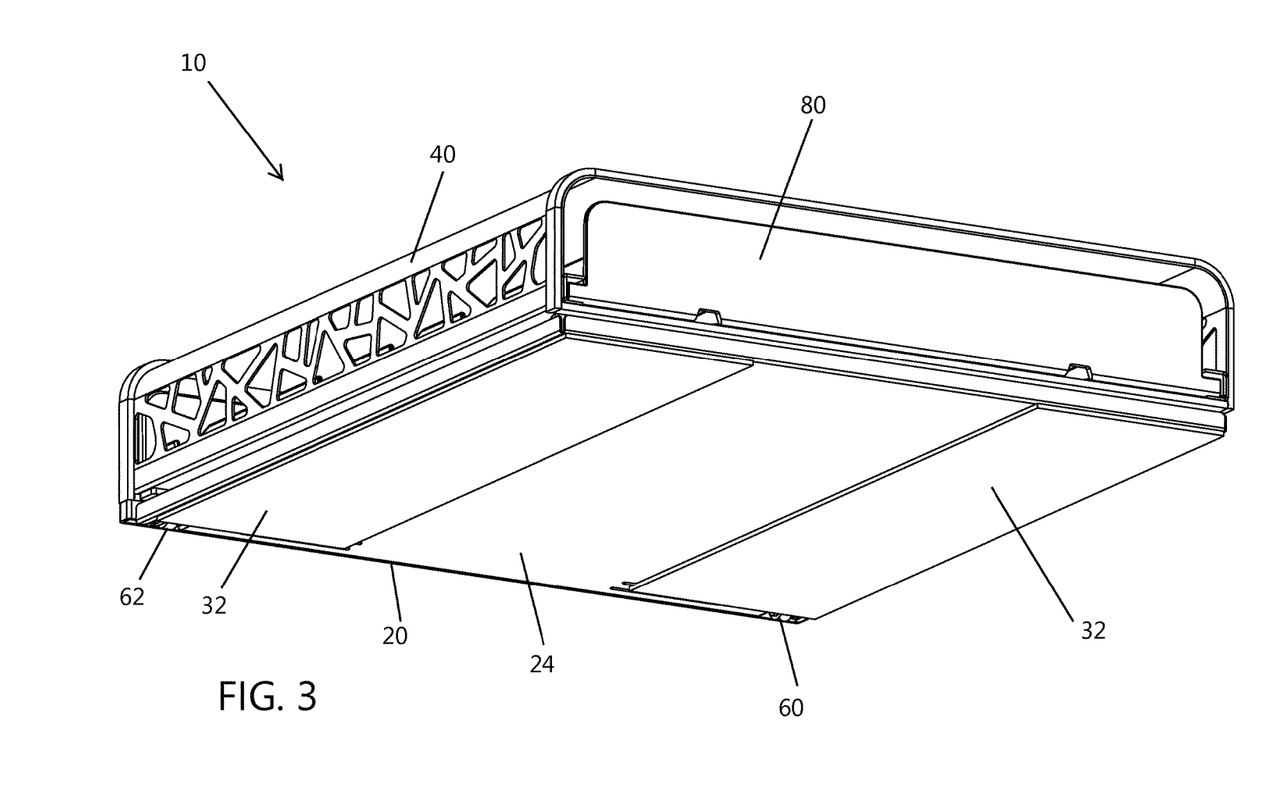
FIG. 3 is a back, left, bottom perspective view of a tray holder apparatus of the type shown in FIG. 1.
Figure 4:
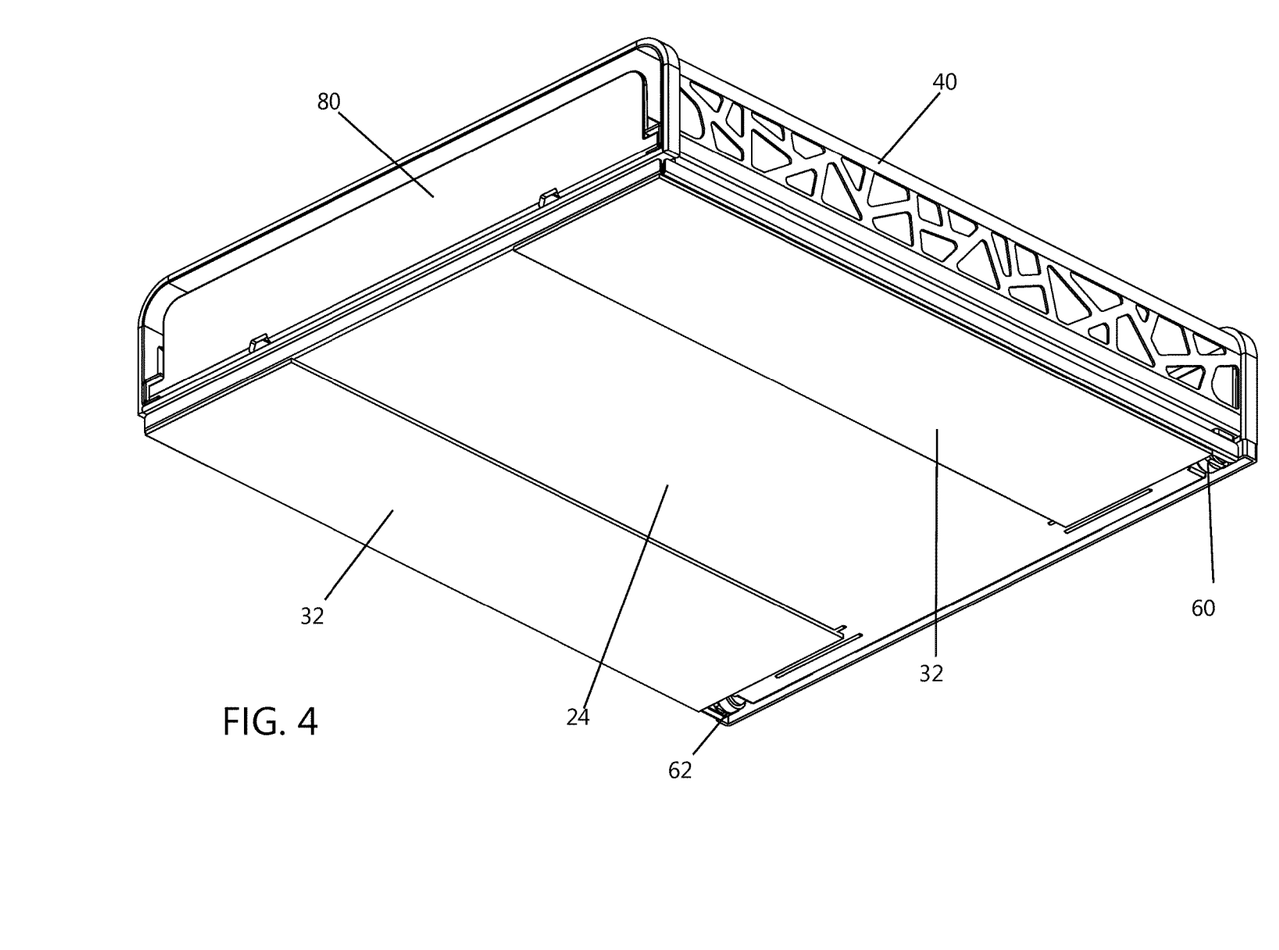
FIG. 4 is a back, right, bottom perspective view of a tray holder apparatus of the type shown in FIG. 1.
Figure 5:
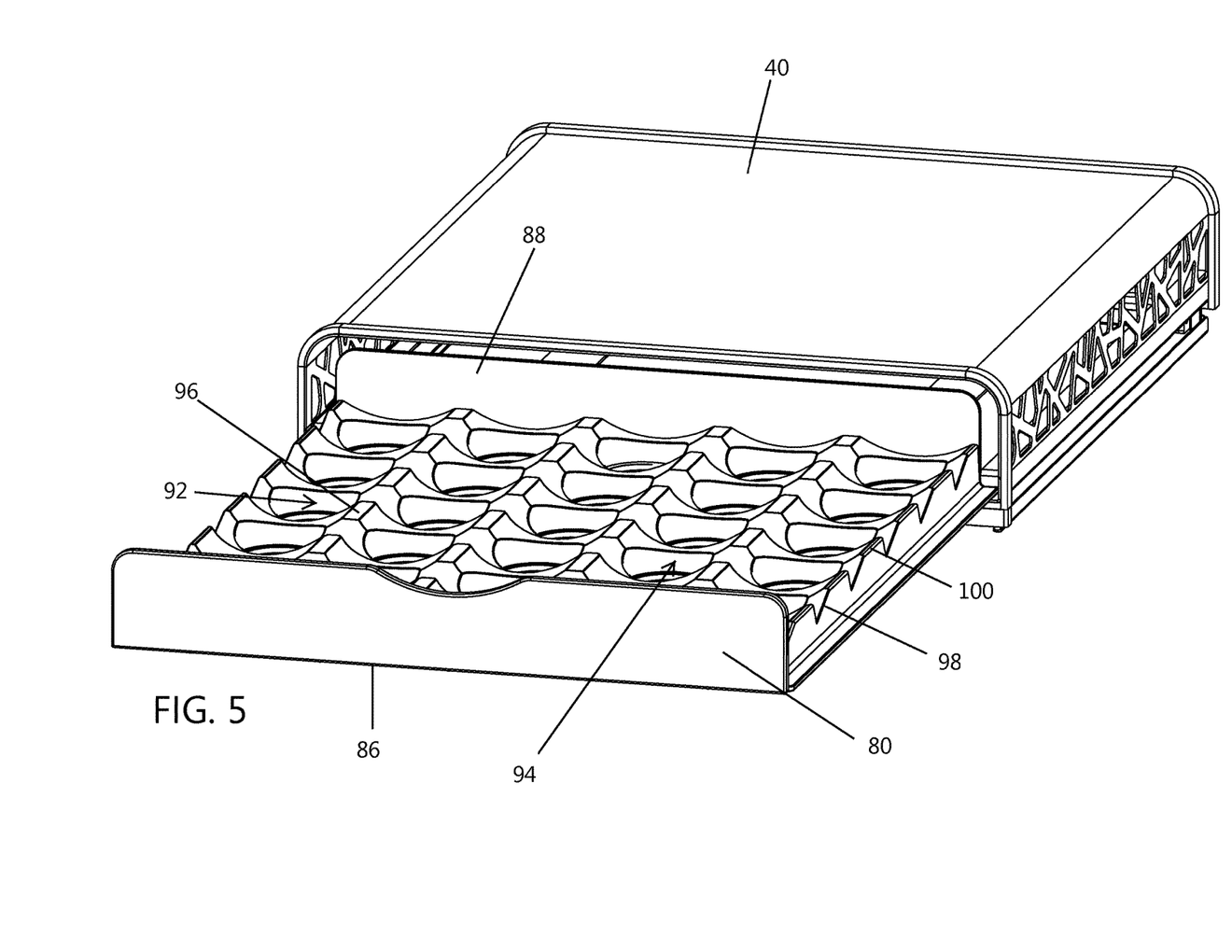
FIG. 5 is a front, right, top perspective view of a tray holder apparatus of the present invention shown with a tray extended.
Figure 6:
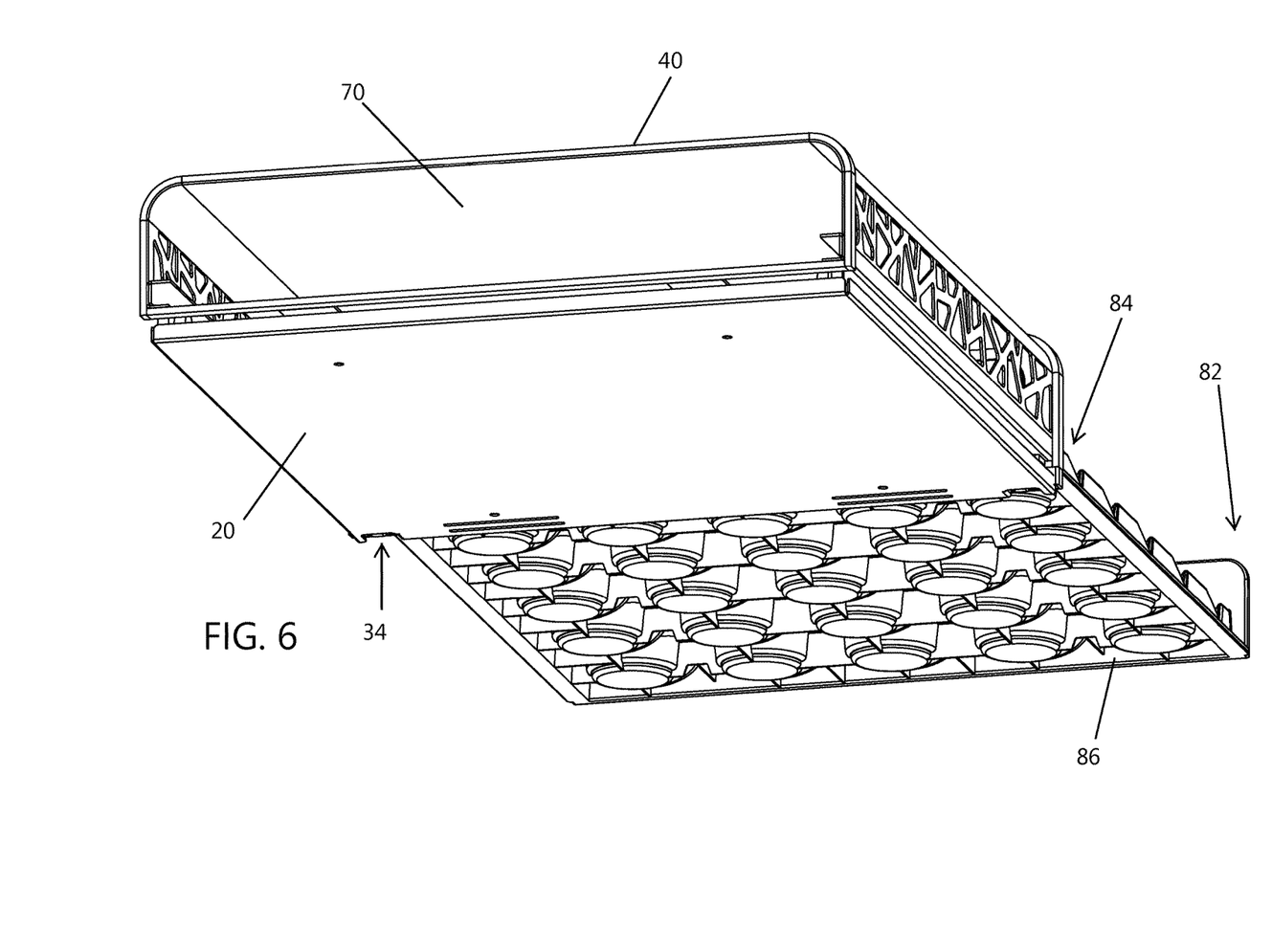
FIG. 6 is a back, left, bottom perspective view of the tray holder apparatus of the type shown in FIG. 5.

FIGS. 5 and 6 show the tray 80 extended from the frame 40. Tray 80 includes a front panel 86 and rear panel 88 that are sized to fit within an open front and back portion 70 of the frame 40. The tray 80 includes multiple receptacles 90 extending into the tray from a substantially planar top portion 100 of the tray 80. The multiple receptacles 90 are aligned in rows 92 and columns in the tray to further create an aesthetic presentation of the tray. Arrows 82 and 84 identify the general location of the front portion 86 of the tray 80 when the tray is oriented in the open and stowed positions 82 and 84 respectively. The receptacles 90 further include a top edge 96 of each receptacle that angles downward towards a front panel 86 of the tray. The angled top edge 96 provides an angled surface onto which a top portion of a beverage package rests. In this manner, the top portion of the beverage package is more readily observed when the drawer or tray 80 is oriented in the open position 82. The base 20 includes slots 34 that are adapted to receive wheels 56 and 56 that are attached to frame 40.

Figure 7:
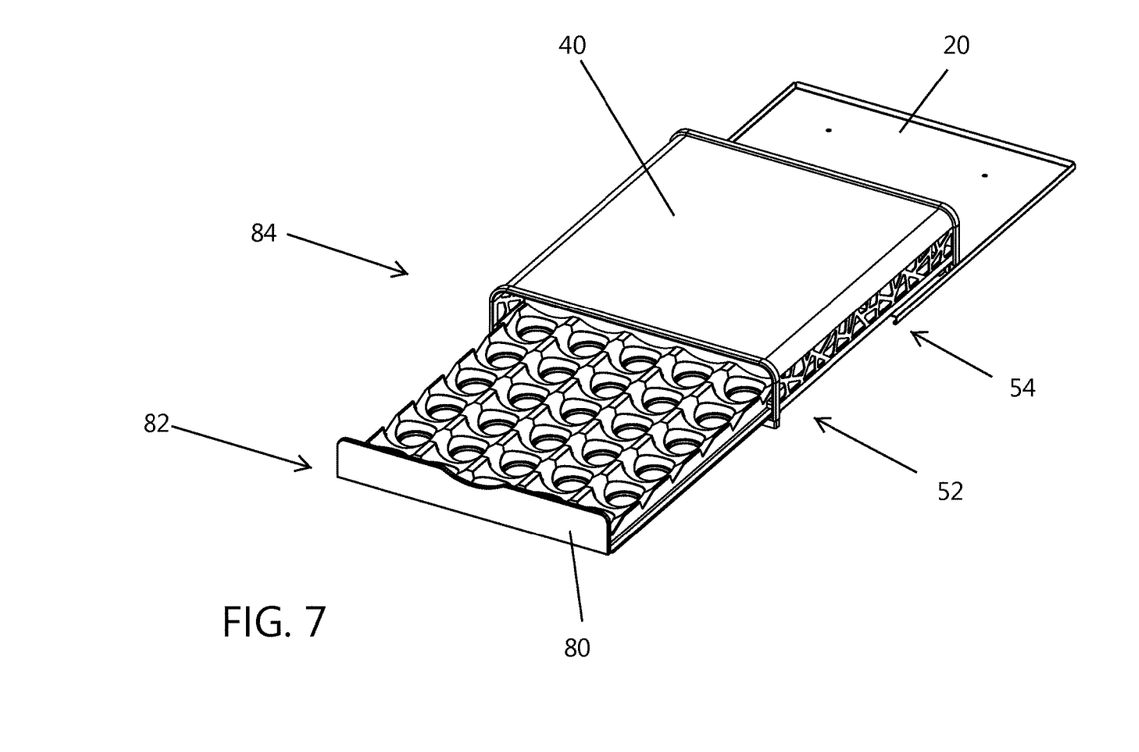
FIG. 7 is a front, right, top perspective view of a tray holder apparatus of the present invention shown with a tray extended from a frame and a frame extended from a base.
Figure 8:
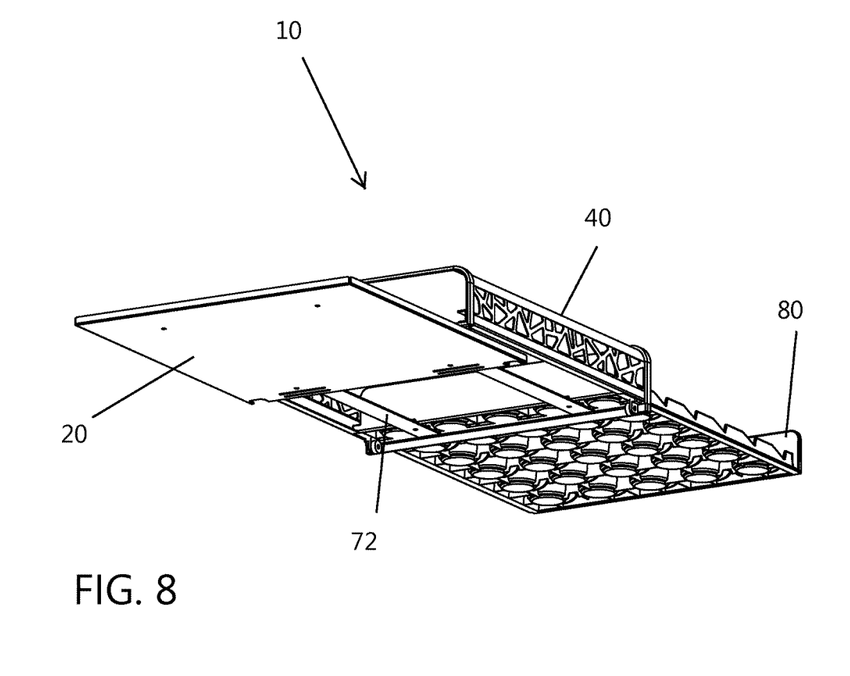
FIG. 8 is a back, left, bottom perspective view of a tray holder apparatus of the type shown in FIG. 7 with the tray extended from the frame and the frame extended from the base.

FIGS. 7 and 8 show both the frame 40 extending from the base 20 and the tray 80 extending from the frame 40. Arrows 82 and 84 identify the general location of the front portion 86 of the tray 80 when the tray is oriented in the open and stowed positions 82 and 84 respectively relative to the frame 40. Arrows 52 and 54 identify the general location of the front portion 42 of the frame 40 when the frame is oriented in the open and stowed positions 52 and 54 respectively relative to the base 20. The open bottom 68 portion of the frame 40 includes rails 72 that provide stability and a distinguishable look from under the frame 40.

Figure 9:
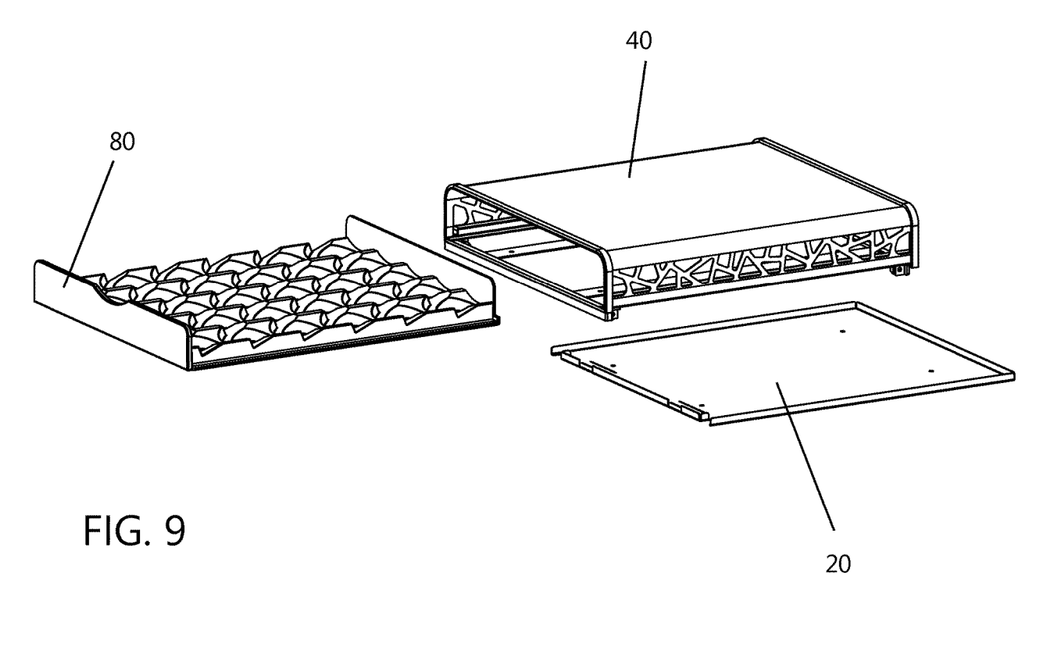
FIG. 9 is an exploded front, right, top perspective view of the tray, frame and base of the tray holder apparatus of the present invention.
Figure 10:
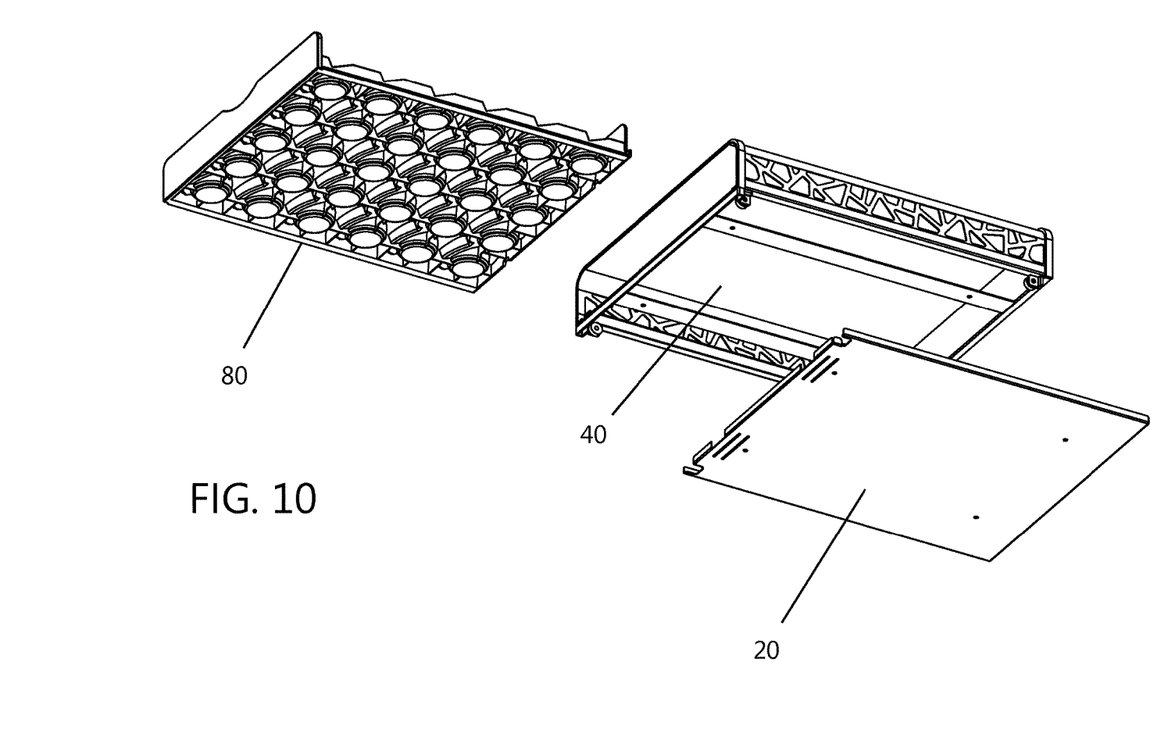
FIG. 10 is an exploded back, left, bottom perspective view of the tray, frame and base of the type shown in FIG. 9.
Figure 11:
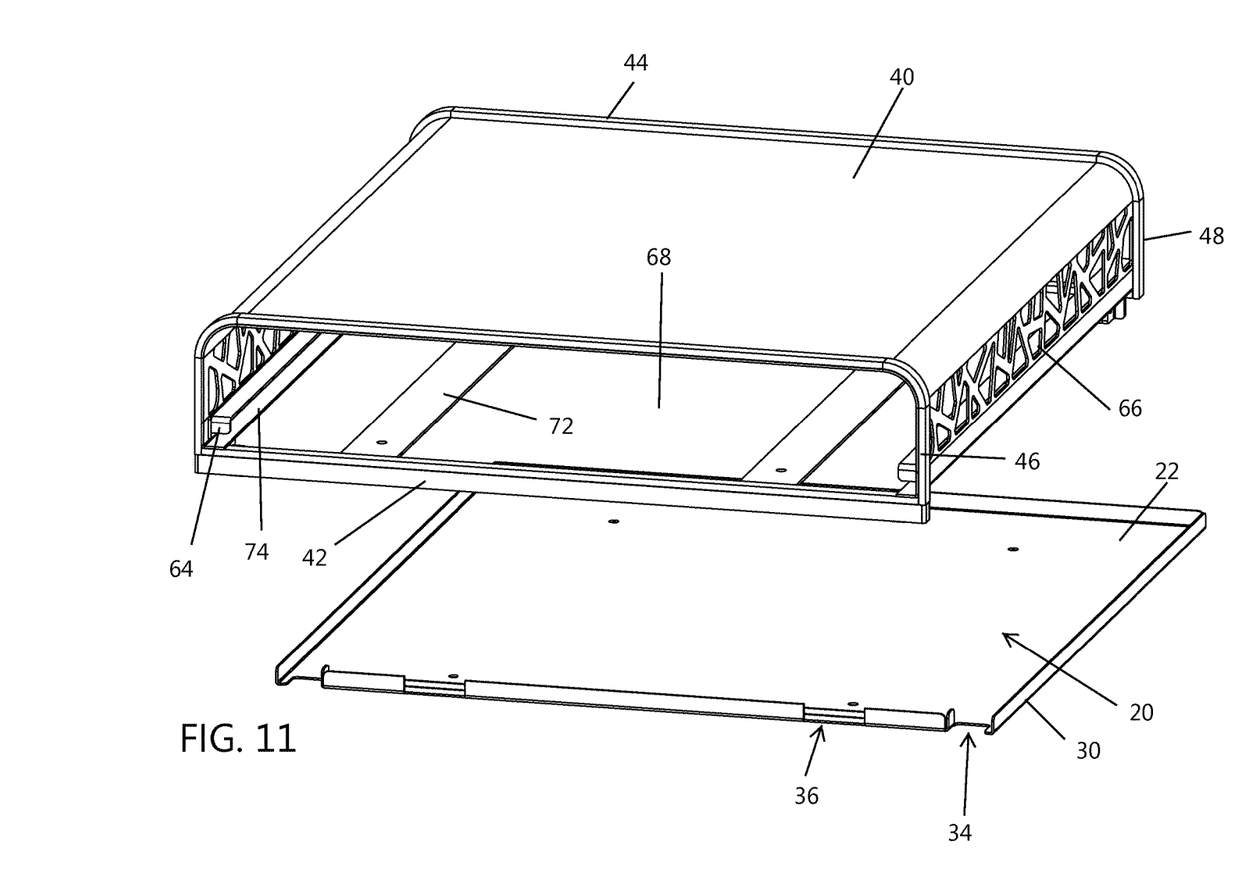
FIG. 11 is a front, right, top, perspective view of a frame elevated above a base of the tray apparatus of the present invention.
Figure 12:
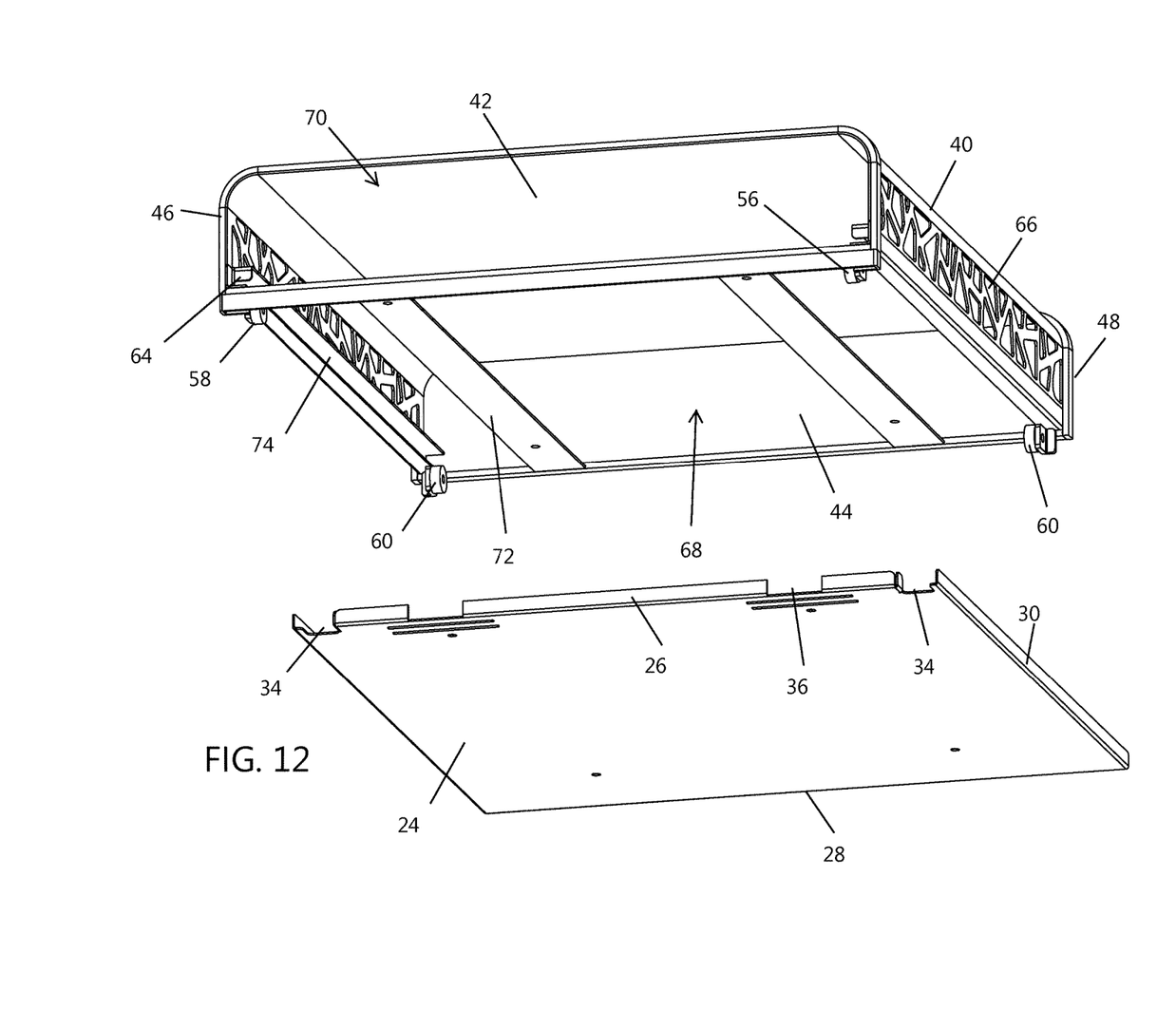
FIG. 12 is a back, left, bottom perspective view of the frame and base of the type shown in FIG. 11.

FIGS. 9 and 10 illustrate the apparatus 10 in a disassembled state. Frame 40 is shown elevated above the base 20 and the tray 80 is completely removed from frame 80. FIGS. 11 and 12 further illustrates the interlock and coupling between the frame 40, base 20 and tray 80. Base 20 includes a top surface 22 and bottom surface 24. Frame 40 rests on the top surface 22 of the base 20 and the bottom surface 24 of the base 20 is particularly well adapted to rest on a kitchen countertop. Base 20 further includes a flange 30 extending upward from the top surface or portion 22 of the base around a perimeter of the base. The base 20 further includes front and back portions 26 and 28 wherein cutouts or slots 34 and 36 are formed in the base 22. Slots 34 are sized to receive wheels 56 and 58 of the frame 40 without contacting the base 20. Further, cutouts 36 are sized to allow rails 72 of the frame to pass over the flange 30 without contacting the flange 30 or base 20. Frame 40 includes a front 42 having a front end perimeter portion 46 and a rear 44 having a rear or back end perimeter portion 48. When the tray 80 is in the stowed position 84, the front portion 86 aligns approximately flush with the front perimeter end 42 of the frame 40. Wheels 56 and 58 are rotatably attached to front 42 of the frame 40 and wheels 60 and 62 are attached to rear 44 of the frame 40. The frame 40 includes an upper ledge and interlock 64 and lower ledge 74 extending longitudinally along an interior of the sides of the frame. The tray includes extensions 102 that extend along both side edges of the tray 80. The extensions 102 of the tray slide along a top surface of the lower ledge 74 of the frame. The interlock ledge 64 restricts the tray from extending out of the frame beyond the front portion of the interlock 64 and the interlock ledge 64 engages a top of extensions 102 to restrict the tray from tipping down when the tray is oriented in the extended position 52. Frame 40 further includes cutouts 66 in the sides, open front and back 70 and open bottom 68 of the frame to provide an aesthetic look and to further allow air to pass through the frame.

Figure 13:
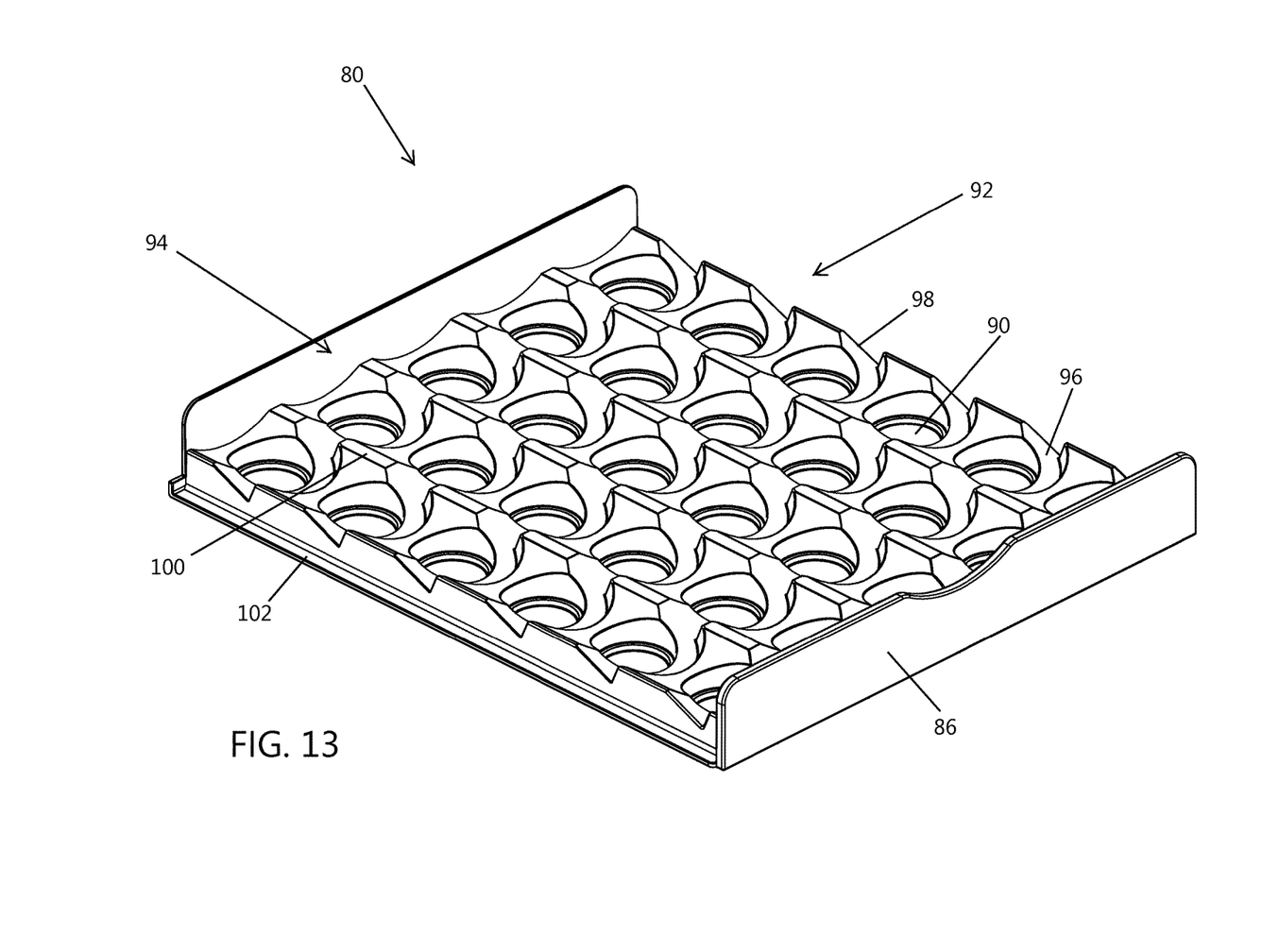
FIG. 13 is a front, left, top perspective view of a tray of the tray apparatus of the present invention.
Figure 14:
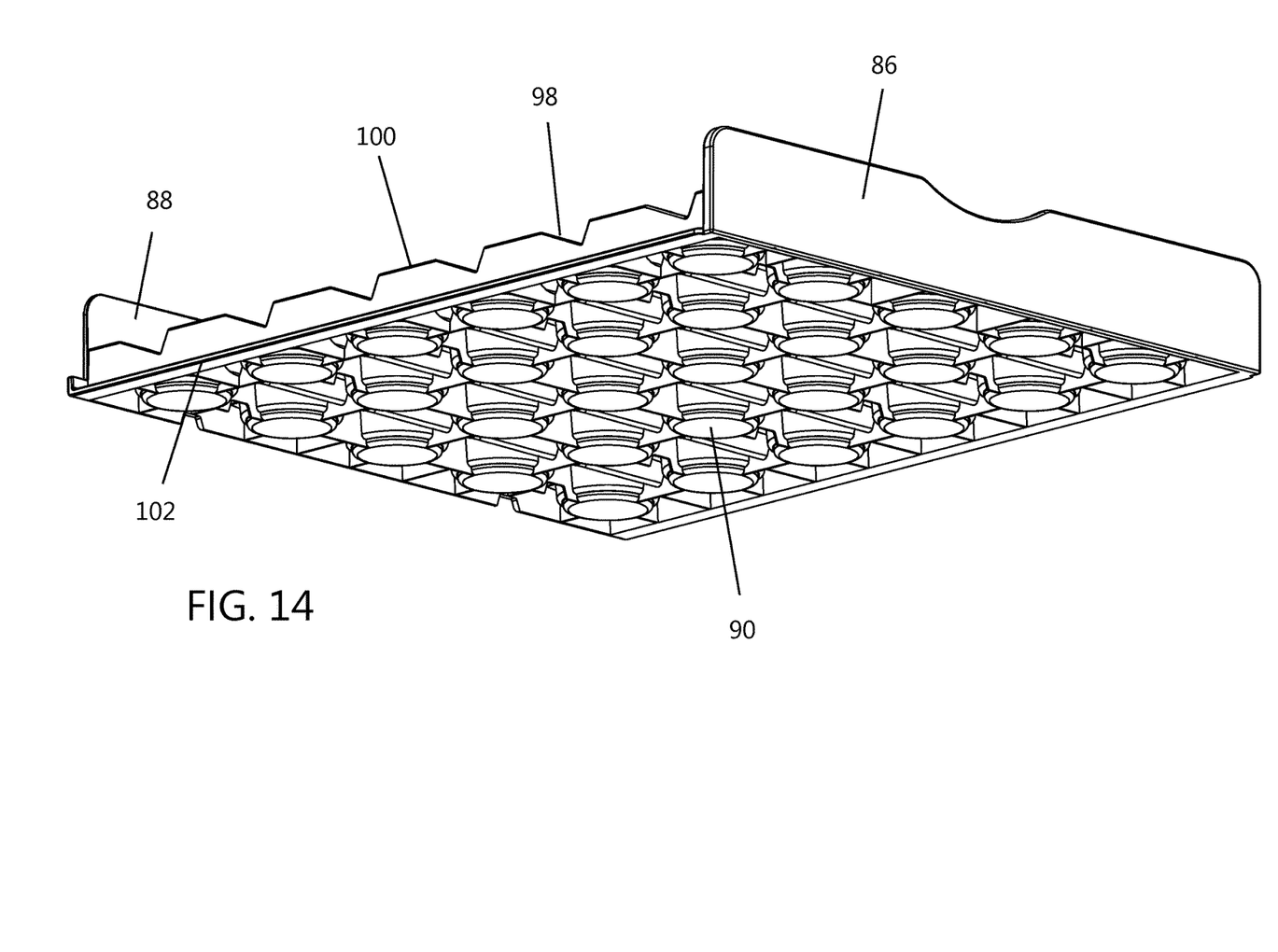
FIG. 14 is a front, left, bottom perspective view of the tray of the type shown in FIG. 13.

FIGS. 13 and 14 further illustrates an embodiment of the tray 80. Tray 80 is orientable between an open position 82 and closed position 84. Tray 80 includes a front panel 86 and rear panel 88 that are sized to fit within an open front and back portion 70 of the frame 40. The tray 80 includes multiple receptacles 90 extending into the tray from a substantially planar top portion 100 of the tray 80. The multiple receptacles 90 are aligned in rows 92 and columns in the tray to further create an aesthetic presentation of the tray. The receptacles 90 further include a top edge 96 of each receptacle that angles downward towards a front panel 86 of the tray. An extension ledge 102 extends along a longitudinal sides of the tray 80.

In use, the front wheels 56 and 58 roll on the countertop while the rear wheels 60 and 62 roll on the base 20 when the frame is pulled over the base between the extended and retracted orientations 52 and 54. Additionally, tray 80 may be slid along ledge 74 between the open position 82 and closed position 84. In this manner, a user may choose to orient the apparatus 10 in multiple orientations. By way of example, the frame may be positioned in the retracted position 54 while the tray 80 is oriented in the open position 82. Alternatively, the frame may be oriented in the extended position 52 and the tray 80 may be slid between the open and closed positions 82 and 84 to access the contents stored within the tray 80.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. An apparatus for supporting a beverage maker and single serve beverage packages, the apparatus comprising:
   a substantially planar base having a top surface, a front edge, a back edge, and a bottom surface, wherein said bottom surface is adapted to rest on a supporting surface;
   a frame capable of supporting the beverage maker wherein said frame is slidingly coupled to the base, said frame having a front portion and a back portion wherein said back portion of the frame slides above the top surface of the base between an extended and retracted position of the frame such that said back portion of said frame aligns with said back edge of said base and said front portion of said frame aligns with said front edge of said base when said frame is in the retracted position; said frame having front and rear wheels rotatably attached to the frame, wherein said front wheels do not contact the base when the frame is in the retracted position and wherein said rear wheels contact the base when the frame is in the retracted position; and
   a tray for supporting the beverage packages, said tray having extensions extending from sides of said tray, wherein said extensions slidingly engage with a lower ledge of said frame, said tray being orientable between an open and stowed position, wherein said tray has a front portion that extends outward and away from said front portion of said frame when said tray is oriented in the open position and wherein the front portion of the tray aligns with said front portion of said frame when the tray is in the stowed position.

2. The apparatus as recited in claim 1 further including a gripping member on the bottom surface of said base.

3. The apparatus as recited in claim 1 further including slots formed in said base, wherein said slots are sized to receive said front wheels of said frame.

4. The apparatus as recited in claim 1, wherein said frame has an open bottom portion.

5. The apparatus as recited in claim 1, wherein said frame has at least partially open sides and back to allow air to pass through said frame.

6. The apparatus as recited in claim 1, wherein an interior of said tray includes spaced apart receptacles, wherein said receptacles form columns and rows within said tray and further wherein a top edge of each said receptacle is angled to display the beverage packages at an angle.

7. An apparatus for supporting a beverage maker and single serve beverage packages, the apparatus comprising:
   a base having planar top portion, a front edge, a back edge, and bottom surface portion, said base further having slots formed in said base, wherein said bottom surface is adapted to rest on a supporting surface;

a frame for supporting the beverage maker wherein said frame is slidingly coupled to the base, said frame having a front portion and a back portion wherein the frame slides above the base between an extended and stored position such that said back portion of said frame aligns with said back edge of said base when said frame is in the stored position and further such that said front portion of said frame aligns with said front edge of said base when said frame is in the stored position and said front portion of said frame is not aligned above the base when said frame is in the extended position;

said frame having front and rear wheels rotatably attached to the frame, wherein said front wheels are positioned within said slots and do not contact the base when the frame is in the stored position and said rear wheels are in contact with the base when the frame is in the stored position; and a tray for supporting the beverage packages, said tray having extensions extending from sides of said tray, wherein said extensions engage with said frame and said tray is orientable between an open and stowed position, wherein said tray has a front portion that extends outward from said frame and said front portion is separated by a distance from said front portion of said frame when said tray is oriented in the open position and wherein the front portion of said tray aligns with a front portion of said frame when in a closed position.

8. The apparatus as recited in claim 7 further including a gripping member on the planar bottom surface of said base.

9. The apparatus as recited in claim 7, wherein said frame has an open bottom portion.

10. The apparatus as recited in claim 7, wherein said frame has at least partially open sides and back to allow air to pass through said frame.

11. The apparatus as recited in claim 7, wherein an interior of said tray includes spaced apart receptacles, wherein said receptacles form columns and rows within said tray and further wherein a top edge of each said receptacle is angled to display the beverage packages at an angle.

12. The apparatus as recited in claim 11, wherein said frame has at least partially open sides and back to allow air to pass through said frame.

13. An apparatus for supporting a beverage maker and single serve beverage packages, the apparatus comprising:

a base having planar top and bottom surface portions, said base having slots formed in said base, wherein said bottom surface is adapted to rest on a supporting surface;

a frame slidingly coupled to the base, wherein the frame slides above the base between an extended and stored position such that a front portion of said frame is separated from said base by a distance when said frame is in the extended position and the front portion of the frame aligns with a front edge of the base when said frame is in the stored position; said frame having at least two front wheels and at least two rear wheels rotatably attached to the frame, wherein at least two of the front wheels are positioned within said slots and do not contact the base when the frame is in the stored position and at least two of the rear wheels contact the base when the frame is in the stored position;

a tray that slidingly engages with said frame and that is orientable between an open and stowed position, wherein said tray has a front portion that extends outwardly from said frame beyond the front portion of the frame when said tray is oriented in the open position and wherein the front portion of said tray aligns with the front portion of said frame when in the stowed position; and wherein an interior of said tray includes rows and columns of spaced apart receptacles for supporting the beverage packages within said tray, each said receptacle having a top edge that is angled relative to a planar top of said tray such that beverage packages resting in said receptacle displays a top of the beverage package at an angle relative to the supporting surface on which said base rests.

14. The apparatus as recited in claim 13 further including a gripping member on the planar bottom surface of said base.

15. The apparatus as recited in claim 14, wherein said frame has an open bottom portion.

16. The apparatus as recited in claim 15, wherein said frame has at least partially open sides and back to allow air to pass through said frame.

17. The apparatus as recited in claim 14, wherein said frame has at least partially open sides and back to allow air to pass through said frame.

* * * * *